United States Patent
Koehler et al.

(10) Patent No.: US 10,297,049 B2
(45) Date of Patent: May 21, 2019

(54) STATISTICALLY WEIGHTED REGULARIZATION IN MULTI-CONTRAST IMAGING

(71) Applicant: KONINKLIJKE PHILIPS N.V., Eindhoven (NL)

(72) Inventors: Thomas Koehler, Norderstedt (DE); Bernhard Johannes Brendel, Norderstedt (DE); Frank Bergner, Hamburg (DE)

(73) Assignee: KONINKLIJKE PHILIPS N.V., Eindhoven (NL)

(*) Notice: Subject to any disclaimer, the term of this patent is extended or adjusted under 35 U.S.C. 154(b) by 0 days.

(21) Appl. No.: 15/533,468

(22) PCT Filed: Nov. 26, 2015

(86) PCT No.: PCT/EP2015/077708
§ 371 (c)(1),
(2) Date: Jun. 6, 2017

(87) PCT Pub. No.: WO2016/091594
PCT Pub. Date: Jun. 16, 2016

(65) Prior Publication Data
US 2017/0345191 A1    Nov. 30, 2017

(30) Foreign Application Priority Data
Dec. 10, 2014  (EP) ..................................... 14197076

(51) Int. Cl.
G06T 11/00    (2006.01)
G06T 5/00     (2006.01)
G06T 5/50     (2006.01)

(52) U.S. Cl.
CPC ............ *G06T 11/008* (2013.01); *G06T 5/002* (2013.01); *G06T 5/50* (2013.01); *G06T 11/006* (2013.01);
(Continued)

(58) Field of Classification Search
CPC ..... G06T 11/006; G06T 5/002; G06T 11/008; G06T 2211/421; G06T 5/50; A61B 6/484; A61B 6/5258
See application file for complete search history.

(56) References Cited

U.S. PATENT DOCUMENTS

| | | | |
|---|---|---|---|
| 2002/0136437 A1* | 9/2002 | Gerard | G06T 7/60 382/128 |
| 2005/0089239 A1* | 4/2005 | Brajovic | G06T 5/50 382/266 |

(Continued)

FOREIGN PATENT DOCUMENTS

WO    2013/088294    6/2013

OTHER PUBLICATIONS

Rigie, et al., "Joint reconstruction of multi-channel, spectral CT data via constrained total nuclear variation minimization", Physics in Medicine and Biology, vol. 60, No. 5, Oct. 1, 2014.

(Continued)

*Primary Examiner* — Kenny A Cese

(57) ABSTRACT

An image processing system (IPS) and related method to transform different multi-modal or multi-contrast input images (u,v) into respective transformed images (U,V). The transformation may proceed iteratively to improve a regularized objective function. The regularization is via a regularizer function (R). The regularizer function (R) is computed from noise normalized gradients of the two or more transformed images (u,v).

20 Claims, 3 Drawing Sheets

(52) U.S. Cl.
CPC ............... *G06T 2207/10072* (2013.01); *G06T 2207/20221* (2013.01); *G06T 2211/408* (2013.01)

(56) References Cited

U.S. PATENT DOCUMENTS

2014/0314295 A1* 10/2014 Omi ................ G06T 3/0068 382/131
2015/0187096 A1* 7/2015 Baturin ................ G01T 1/164 382/132

OTHER PUBLICATIONS

Holt, et al., "Total Nuclear Variation and Jacobian Extensions of Total Variation for Vector Fields", IEEE Transactions on Image Processing, vol. 23, No. 9, Sep. 1, 2014.

Lefkimmiatis, et al., "Convex Generalizations of Total Variation Based on the Structure Tensor with Applications to Inverse Problems" In: Lecture Notes in Computer Science, Jan. 1, 2013.

Rigie, et al., "A generalised vectorial total variation for spectral Ct reconstruction" Proceedings of the Third International Conference on Image Formation in X-Ray Computed Tomography, Jun. 22, 2014.

Ehrhardt, et al., "Vector-Valued Image Processing by Parallel Level Sets", IEEE Transactions on Image Processing, vol. 23, No. 1, Jan. 1, 2014.

Bech at al., "Quantitative x-ray dark-field computed tomography", Phys. Med. Biol. 55 (2010) 5529-5539).

Weber et al., "Noise in x-ray grating-based phase-contrast imaging", Medical Physics 38 (2011).

Wunderlich et al., "Image covariance and lesion detectability in direct fan-beam X-ray computed tomography", Physics in Medicine and Biology 53 (2008).

Chen, et al., "Scaling law for noise variance and spatial resolution in differential phase contrast computed tomography" Med. Phys. 38 (2), Feb. 2011.

* cited by examiner

STATISTICALLY WEIGHTED REGULARIZATION IN MULTI-CONTRAST IMAGING

CROSS REFERENCE TO RELATED APPLICATIONS

This application is the U.S. National Phase application under 35 U.S.C. § 371 of International Application No. PCT/EP2015/077708, filed Nov. 26, 2015, published as WO 2016/091594 on Jun. 16, 2016, which claims the benefit of European Patent Application Number 14197076.4 filed Dec. 10, 2014. These applications are hereby incorporated by reference herein.

FIELD OF THE INVENTION

The invention relates to an image processing system, to an image processing method, to a computer program product, and to a computer readable medium.

BACKGROUND OF THE INVENTION

In multi-modal or, more generally, multi-contrast imaging a plurality of images are furnished in different image channels. The contrast in those images usually corresponds to different physical properties of an imaged object or results from different manners of interaction of the object with the radiation used for imaging. There is prior knowledge in such systems that the images from the different channels relate to the same object. It has been noted by Applicant that very few approaches have been proposed in the past to use this prior knowledge in processing such images, for instance, in reconstruction or de-noising.

Although some recently proposed solutions make some inroads on this (see for instance D S Rigie and P J La Riviere, "A generalized vectorial total-variation for spectral CT reconstruction", Proceedings of the Third International Conference on Image Formation in X-ray Computed Tomography, vol 1, No 1, pp 9-12, 2014), it has been observed that the fidelity of the reconstructed imagery on occasions falls short of expectations.

SUMMARY OF THE INVENTION

There may therefore be a need in the art for an alternative image processing method or related system.

The object of the present invention is solved by the subject matter of the independent claims where further embodiments are incorporated in the dependent claims.

It should be noted that the following described aspect of the invention equally applies to the image processing method, to the computer program product, and to the computer readable medium.

According to a first aspect of the invention, there is provided an image processing system, comprising:

an input port for receiving a plurality of input images including two or more input images of the same object, wherein the object has two or more different contrast modes, wherein each image is representative of one or a combination of the different contrast modes of the object;

an image transformer configured to transform the plurality of the two or more input images into respective transformed images;

wherein operation of the transformer is driven by a regularized objective function that includes a regularizer function as at least one functional component;

wherein the regularizer function includes at least one term computed from noise normalized gradients in at least one (preferably all) of the two or more transformed images or in at least one of the respective intermediate images generated during operation of said image transformer.

In other words, what is proposed herein is a normalization, e.g. by statistical weighting, of gradients through operation of the regularization term in multi-modal or multi-contrast image processing. The proposed method ensures that the regularization acts against bias induced by a mere difference in scaling of the images. In other words, an otherwise large gradient response (as, e.g., in Rigie cited supra) that stems from a scaling difference in the two images is now mitigated by the new regularization function proposed herein. Applicant's method is therefore more consistent across a wider range of input imagery of different scaling whatever their prominence.

According to one embodiment, the image transformer is configured to implement a reconstruction algorithm (in one embodiment an iterative reconstruction), the two or more transformed images being respective reconstructions for the respective contrast modes from input images and the two or more transformed images and/or the intermediate images being generated during the course of one or more iterations, wherein at least one of the input images are projection image data detected at a detector of an imaging system after interaction of radiation with said object.

According to one embodiment, the normalization of the gradients is based on a local statistical variance in at least one of the respective input images or intermediate images.

According to one embodiment, the variances are obtained from error propagation through an analytical reconstruction based on the input image data.

According to one embodiment, the variances are estimated based on respective voxel data in at least one of the respective input images or intermediate images or transformed images.

According to one embodiment, the two or more input images of different contrast modes include any one of: i) the refraction image and/or absorption image and/or dark field image as obtained in phase contrast imaging, ii) the respective images obtained in spectral imaging in respective ones of at least two energy channels.

According to one embodiment, the image transformer is configured to implement an image denoising algorithm, the respective transformed images being the respective images output by the algorithm as denoised versions of the two or more input images.

According to one embodiment, the at least one of the two or more input images are generated as respective filtered backward-projection images of projection images data.

According to one embodiment, the input images are respective color channels of an optical imaging system (that is, a system based on non-ionizing radiation such as optical light).

The respective input images and/or, as the case may be, intermediate images record different contrast types in dependence of the object's contrast mode imaged for during the acquisition. The different contrast types may also be recovered by post-acquisition signal processing. In general, the contrast in the input images (and hence in the respective intermediate and output images) are representative of different physical principles or of at least of different levels of the same physical principle. The input images may be generated from input image signals picked up in different channels of a multi-channel imaging system. The input images or intermediate images that record contrast of different type include in particular images generated by different imaging modalities (such as CT (computed tomography) and PET (positron emission tomography) or CT and MRI (magnetic resonance imaging) etc., all envisaged herein) although these modalities may not necessarily form two separate entities but may be integrated into the same system. The radiation used for the image acquisition is of the ionizing type (X-ray radiation) but optical imagery based on the detection of non-ionizing (in particular visible light) is also envisaged herein.

Multi-contrast or multi-modal imaging as envisaged herein may also include splitting up a detector signal by suitable image processing circuitry into two or more image signals corresponding to the channels. The phase retrieval step in phase contrast imaging is one example for this, were the three different contrasts (absorption, scatter, and phase contrast) are obtained by curve fitting to oscillating detector pixel signals caused for instance by phase stepping during phase retrieval as has been described elsewhere (M Bech at al., "Quantitative x-ray dark-field computed tomography", Phys. Med. Biol. 55 (2010) 5529-5539). Yet another multi-contrast imaging method where the proposed method can be applied is dual energy or spectral CT, where the detector device may itself be of a multi-channel type such as multi-bin photon counting detectors. Alternatively, imaging for different channels may be achieved by a single response detector by using any X-ray source to acquire sets of images at different voltages.

BRIEF DESCRIPTION OF THE DRAWINGS

Exemplary embodiments of the invention will now be described with reference to the following drawings wherein.

DETAILED DESCRIPTION OF EMBODIMENTS

Figure 1:
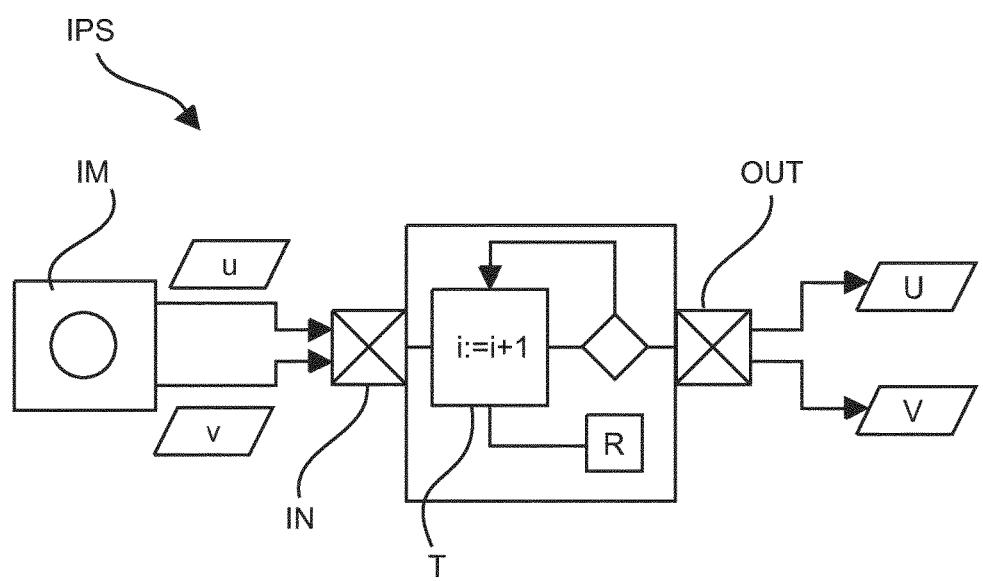
FIG. 1 shows a schematic diagram of an image processing system.

FIG. 1 shows a schematic block diagram of an image processing arrangement.

The image processing arrangement includes an image processing system IPS having an image transform component T whose operation is based on a numerical optimization scheme driven by a suitable objective function F.

The objective function is regularized, that is, it includes as a functional component a regularization or penalty function R. The regularization function (also referred to as "regularizer") is used to enforce certain desirable properties of the solutions, that is, of the transformed images U, V, to be obtained.

In operation, the image processing system IPS receives at its input port IN two or more multi-modal or at least multi-contrast images u, v. The transformer T then operates using a suitable solution algorithm to, in one embodiment iteratively, search for solutions in an "image domain" that improve the objective function F. In other words, F "drives" the optimization. In one embodiment, the search operation may include iterating through one or more intermediate images where the subscript i denotes the iteration number, but one step, non-iterative, regularized solution algorithms are also envisaged herein. At the conclusion of the transformation operation (e.g. at the conclusion of one or more iterations), the two transformed images U, V are output at output port OUT.

The respective output images U, V correspond in most cases to the respective contrast or modality type of the respective input images u, v. The notation with corresponding lower and upper case letters for input and output images has been adopted herein as in most embodiments there is a one-to-one correspondence between u and U on the one hand and v and V on the other. However, also more general relationships are envisioned as will be detailed further below.

A number of different embodiments for the transformer T are envisaged. For instance, the transformer T may be configured as an iterative image re-constructor that operates on multi modal or multi contrast projection images as input images to produce cross sectional images U, V. These embodiments envisage spectral (e.g., dual) CT or CT phase contrast imaging (PCI, e.g., differential phase contrast imaging DPCI). In other embodiments the transformer is an image de-noiser that may operate on CT, MRI or any other imagery including optical imagery.

In more detail, the following applications (and related combinations of input images) are envisaged herein:

Application to denoising: The input images are the different color channels (red, green, blue) of an image. The transformed images are denoised versions of the input images. The input images and/or transformed images may also be provided in another basis used in color image representation such as HSL, HSV, or CMYK (http://en.wikipedia.org/wiki/List_of_color_spaces_and_their_uses as per 1 Aug. 2014).

Application to denoising in CT: The input images are images representing the attenuation due to the photo-electric effect and due to Compton scattering in a dual energy CT system. The output images are the denoised version of the input images.

Application to denoising in phase contrast imaging: The input images are the images representing the attenuation, the electron density (related to refraction) and small angle scattering power of the object. The output images are the denoised version of the input images.

Application to phase contrast image reconstruction: The input images are projection data or differential projection data of the attenuation, the electron density, and the small angle scattering power of the object. The transformed images are the spatial distribution of the attenuation, the electron density, and the scattering power of the object.

Application to PET/MR reconstruction: The input images are projections of the distribution of the radioactive tracer inside the patient and the Fourier-transform of the proton density of the patient (or other quantities related to the protons). The transformed images are the spatial distribution of the radioactive tracer and the protons inside the patient.

Application to dual energy CT: The input images u and v are projection data acquired either at different tube voltages (e.g., acquired with a dual source system or with fast $kV_p$ switching) or with different spectral weighting (e.g., acquired with a dual layer detector). The transformed images U and V are either images reconstructed from the data u and v directly (so that they represent images at different tube voltages, for instance) or reconstruction involves also a transformation into the physical basis, i.e., these images may be water and bone equivalent images, or image representing the x-ray attenuation due to the photo-electric effect and due to Compton scattering.

Application to spectral CT: Input images are the different energy bins acquired by the detector and transformed images are again either "monochromatic" images with a one-to-one correspondence to the energy bins or the transformed images may be again images representing attenuation due to photo-electric effect, Compton scattering, and optionally due to special contrast agents.

Application to spectral CT or dual energy CT: Input images are so-called decomposed projections, i.e. projections of a water and bone-equivalent, or projections of the linear attenuation coefficient of the object separated into photo-electric effect and Compton scattering. Transformed images are directly corresponding the input images.

Figure 2:
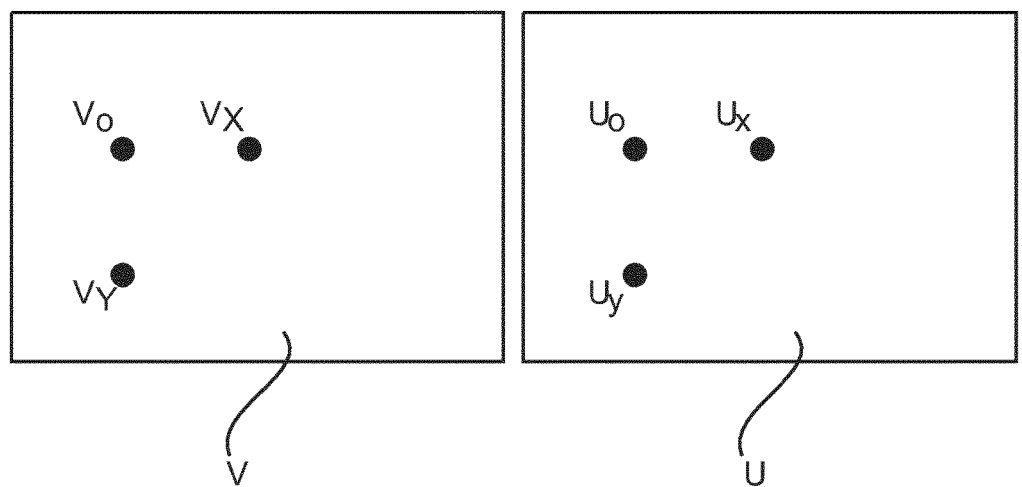
FIG. 2 shows a principle underlying operation of the image processing system of FIG. 1.

An underlying principle for the operation of transformer T will now be explained with reference to FIG. 2. Applicants found a new class of regularization functions R that have been observed to yield high fidelity output imagery. The new principle proposed herein rests on the observation that the input images in multi modal or multi contrast image settings record the same object at the same imaging geometry. It is proposed herein then to model this prior knowledge into the optimization scheme to optimize the objective function on which the transformer T is based. In particular, the prior knowledge is modelled into the structure of the penalizer or regularizer R. What is proposed herein is to use image gradient evaluations to capture image structure in both image channels (U, V) and to normalize said gradients by the expected noise in those images. In particular the normalization is based on statistical noise information as derived from the two or more input images or the intermediate images. This insight is illustrated in FIG. 2 at the example of spectral CT imagery, that is, a photo-electric absorption image U and a Compton scatter image V.

Conventionally, and as proposed elsewhere (e.g. in Rigie et al cited supra) a local penalty contribution of a given voxel (indicated by subscript 0) is calculated from a gradient matrix:

$$G = \begin{pmatrix} V_x - V_0 & V_y - V_0 \\ U_x - U_0 & U_y - U_0 \end{pmatrix} \quad (1)$$

where the gradient values are approximated by finite difference entries for a given image position 0. For simplicity, we use only two dimensional images and two dimensional gradients, but the extension to three dimensions is also envisioned herein.

FIG. 2 is a sketch of the two images U, V with the geometrical point under consideration in both images and its neighboring points (indicated by subscripts x and y). The penalty at the given image position may be calculated as per the nuclear norm or other matrix norm for matrix G. The total penalty may then be computed as the sum of the penalty of some or all image positions.

More generally, also as described for instance in M J Erhardt et al "Vector-Valued Image Processing by Parallel Level Sets", IEEE TRANSACTIONS ON IMAGE PROCESSING, VOL. 23, NO. 1, January 2014, the gradient images $\nabla U$ and $\nabla V$ are computed and a functional $f(\nabla U, \nabla V)$ is used as a penalty. Special examples for the functional $f$ are given in eqs (3) and (4) in combination with eq (5) in the above cited Erhardt reference. Note that the penalty used by Rigie is a special case of this formulation, where the functional $f$ is established by forming for each image point the gradient matrix, calculation of a suitable norm of this matrix followed by a summation of these norms over some or all image points.

The penalty in all these prior art work is dominated by the image that shows numerically the larger gradient. This implies that the penalty depends on the scaling of the images, which is undesired. This is in particular an issue where the images are presented in completely different physical units, such as in DPCI where attenuation, refraction, and small angle scattering images are reconstructed which have all different physical units. Thus, the images and their gradients cannot be meaningfully compared numerically in a direct way. This motivates the proposed normalizing of the local gradients by their expected noise to eliminate in particular scaling differences. Also, in the proposed method the regularizer term attracts lower cost (or, more generally, a favorable regularizer response) for candidate images with better signal-to-noise ratio.

Figure 3:
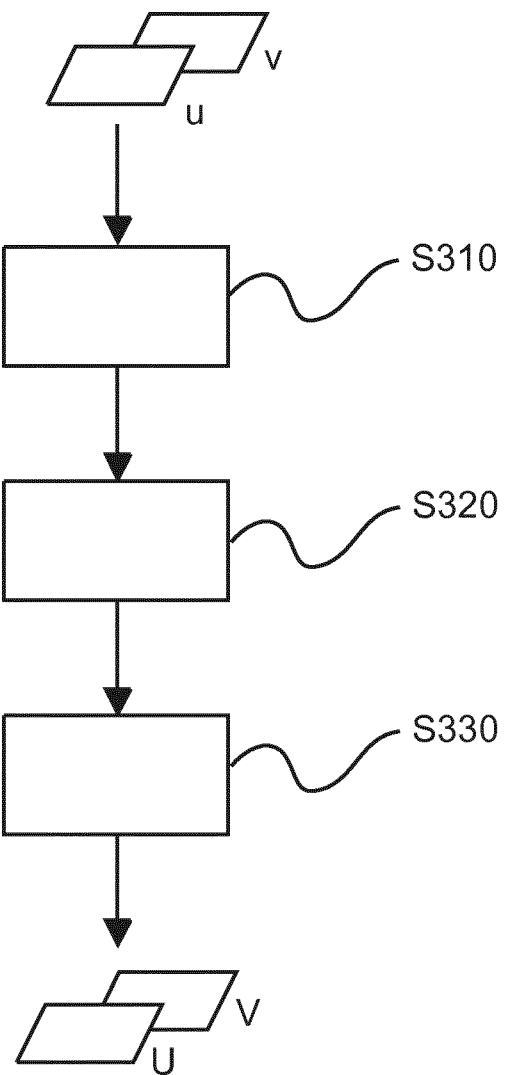
FIG. 3 shows a flow chart of an image processing method.

Operation of the proposed image processing system IPS will now be explained in more detail below at flow chart of FIG. 3.

A multi-modal or multi-contrast imaging modality supplies in at least two or more image channels respective input imagery such as, but necessarily, projection images.

Input images (such as at least one projection image) of different contrast type from the respective channels are then received as respective input images u,v at step S310.

The input images from the different channels encode different image signals each recorded in response to different contrast modes of the imaged object. These contrast causing modes include, for example, in the context of phase contrast imaging, the three contrast types or channels of absorptive, refractive, and scatter properties of the imaged object. In other words, in DPCI imaging we have three input images u, v, w. In spectral CT, the different modes correspond to the different manners in which photons of different energies (making up the imaging radiation) interact with matter and are recorded ("binned") by photon counting circuitry of the spectral detector used. But the different modes in spectral imaging may also be imaged for by using a single channel detector and two or more X-ray voltages and the two or more input projection images are then obtained by signal processing (e.g. curve fitting) the detector signal for each pixel.

At step S320 the input images from the different channels are then transformed into transformed images which are then output at step S330.

The transform may be iterative such as an iterative reconstruction but non-iterative reconstruction algorithms are also envisaged herein. Other examples for transformations, other than reconstruction, are iterative or non-iterative de-noising algorithms or other image processing algorithms that derive from a regularized optimization in respect of the objective function F.

The term "reconstruction" as used herein refers to a transformation from projection domain (the 2D space formed by the detector pixels) to a 3D image domain. This is essentially an imaginary 3D grid in space between the X-ray source and the detector of the imaging system. Reconstruction essentially amounts to the population of points (voxels) of this grid with values that explain the projection images.

The iterative transformation includes an update function that is derived by applying a suitable solution algorithm (such as Newton-Raphson, conjugate gradients, and others) to the objective function F (which in this context is usually referred to as a cost function) with the regularization term R.

A general structure of the objective function F is shown in the following equation.

$$F(U,V) = L(U,V) + \beta R(U,V) \quad (2)$$

where L is the log-likelihood function (or more generally formulated, L is the data term that quantifies in a suitable metric the agreement of the transformed images with the input images) of the images and R is the regularizer and $\beta$ is a regularization parameter balancing the influence of the two terms. The regularizer enforces certain desired smoothness properties and is another metric for the above mentioned agreement but now based on a-priori knowledge, e.g. that image features (such as edges) are to correspond in direction and/or orientation, etc. Typical forms of the log-likelihood function are $$L(U,V) = -\|AU-u\|_{C_u}^2 - \|AV-v\|_{C_v}^2 \quad (2a)$$

where A denotes a forward operator mapping the transformed images U and V from output image domain back into the input image domain of u and v (e.g., in CT the input image domain corresponds the projection domain and the output image domain to the voxel image domain), with AU−u and AV−v being "data terms" for the respective channels where the transformed images are compared against the input data u, v (for instance CT or MRI projection image measurements in one embodiment). The subscripts at the norm indicate a covariance matrix describing the correlation of noise in the input images. Specifically, for a vector w, the definition $$\|w\|_{C_w}^2 = w^T C_w^{-1} w \quad (3)$$

holds, where superscript T indicates a transpose operation on the vector and superscript "−1" indicates the operation to inverse the covariance matrix. Eq. (2a) is a suitable log-likelihood representation for instance for CT and image denoising applications (in the latter, A is the identity operator). For applications in dual energy and phase contrast CT, there may be even noise correlation between the different input images and a more general form of the log-likelihood is preferred $$L(U,V) = \left\| \begin{pmatrix} A \\ B \end{pmatrix} \begin{pmatrix} U \\ V \end{pmatrix} - \begin{pmatrix} u \\ v \end{pmatrix} \right\|_{C_{uv}}^2 \quad (4)$$

where we also allow for different forward operators A and B for the different images U and V, the operators corresponding to the different modalities or contrast types (for instance in DPCI, A may be the normal forward projection operator, and B the differential forward projection operator). In this embodiment, there is a full covariance matrix $C_{uv}$ for the two input images. The notation $$\begin{pmatrix} u \\ v \end{pmatrix}$$

is used to form a vector that contains both input images u, v.

For an application in spectral CT, where there is no one-to-one correspondence between input images and transformed images, the log-likelihood function may then be written as:

$$L(U,V) = \left\| P(U,V) - \begin{pmatrix} u \\ v \end{pmatrix} \right\|_{C_{uv}}^2 \quad (5)$$

where P is now a general forward operator that maps the two transformed images U and V into the spaces of u, v, respectively.

In an iterative setting, there is a corresponding iterative update function that may be written as $$\begin{pmatrix} U_{i+1} \\ V_{i+1} \end{pmatrix} = f_{update}(U_i, V_i)$$

for some functional expression $f_{update}$ which relates to the particulars of the solution algorithm used. The iterative processing of the input images u, v via one or more intermediate images $U_i$, $V_i$, by update function $f_{update}$ amounts to a simultaneous optimization for each channel although, if the objective function F is separable, the optimization may alternatively be executed as two or more separate optimization problems (one for each channel) so long as R is a function of gradients from all channels.

As proposed herein, in one embodiment, regularizer R is a function of gradient information in the input images u,v (and/or the respective intermediate images) each normalized by statistical noise information.

In one embodiment this noise information is defined by statistical variances and in one embodiment the gradient information is computed by way of taking finite differences around each image point or voxel position of the initial and/or intermediate images.

The new regularizer R can then be formulated, in one embodiment, in terms of a noise normalized gradient matrix (and mathematical equivalents thereof):

$$R(U,V) = \|G'(U,V)\| = \left\| \begin{pmatrix} (V_x - V_0)/\sigma_{\Delta V} & (V_y - V_0)/\sigma_{\Delta V} \\ U_x - U_0/\sigma_{\Delta U} & U_y - U_0/\sigma_{\Delta U} \end{pmatrix} \right\| \quad (6)$$

As can be seen in the following equation, unlike the conventional gradient G matrix as per (1), the entries are now not merely the finite differences to approximate the gradients at the respective locations, but now in Eq. (6) each entry in the modified G' matrix is a ratio of the gradient difference and the respective statistical noise at the respect image position. Eq (6) corresponds the value of R returned at the considered voxel 0 with the understanding that R(U,V) denotes the total penalty obtained by summing eq (6) over all image points in the two images.

The norm ∥ ∥ quantifies the respective regularization action of penalty contribution in terms of a non-negative number. In one embodiment, ∥ ∥ is the nuclear norm of this gradient matrix G'. The nuclear norm is the sum of the absolute values of the singular values of G'. Other norms to quantify the gradient information are also envisaged herein such as the Schatten norm or any other matrix norm (http://en.wikipedia.org/wiki/Matrix_norm as per 27 Nov. 2014). In other embodiments, the a monotonic function H(∥G'(U,V)∥) is used as penalty, for instance H(x)=$x^2$, or H(x) being a Huber function with H(x)=$x^2$ for |x|<$\delta$ and H(x)=$2\delta|x|-\delta^2$ else.

In one embodiment the statistical weights $\sigma_{\Delta U}=\sqrt{VAR(\Delta U)}$, $\sigma_{\Delta V}=\sqrt{VAR(\Delta V)}$ are obtained by error propagating techniques where noise information from the projection domain is propagated into the image domain using for instance an analytical reconstruction method such as filtered back projection FBP. This noise information gathering will need to be performed as a pre-processing step on the input projection images. This error propagation of noise from the input image domain (e.g. projection domain for CT) into the (transformed) image domain furnishes a fair and—importantly—a comparable noise estimate across the different images channels u, v or $U_i$, $V_i$. See for instance Weber et al., "Noise in x-ray grating-based phase-contrast imaging", Medical Physics 38 (2011) for the error propagation calculation of input image noise in the case of DPCI. For dual energy imaging using a dual layer detector, one may assume a Gaussian distribution for error propagation purposes.

A comprehensive summary of methods for propagating noise variances from the input image domain into the transformed image domain is described for CT application by Wunderlich and Noo, "Image covariance and lesion detectability in direct fan-beam X-ray computed tomography", Physics in Medicine and Biology 53 (2008) but this method may also be used for input imagery other than CT. Using this error propagation type of processing, it is possible to estimate the noise variances $VAR(V_x-V_0)$, $VAR(V_y-V_0)$, $VAR(U_x-U_0)$, and $VAR(U_y-U_0)$. Note that these variances can be approximated by the variances of a given voxel (as per subscript "0"), for instance by $VAR(V_x-V_0) \approx 2\, VAR(V_0)$ if the noise is spatially only slowly varying and if there is almost no noise correlation between neighboring pixels. This situation is at hand for instance in dual energy or spectral CT.

Note, however, that in DPCI the differential nature of the phase signal imposes a strong spatial correlation of the noise in the phase contrast image, so that the approximation mentioned in the previous paragraph is not the preferred embodiment in this application, although this is not excluded herein and envisaged for some embodiments. In the DPCI case or other cases of non-negligible correlation, the full covariance matrix (that is, one with non-zero off-diagonal elements) is preferably used for the error propagation method. In case where there is no correlation (or only negligible correlation), all off-diagonal elements are zero or treated as vanished. Again, the method discussed in the Wunderlich reference can be used for this purpose.

In an alternative embodiment, a reasonable estimate for the statistical variances in the transformed images U, V, $U_i$, $V_i$, can be obtained by analysis of the noise power spectrum. This is possible because the noise power spectrum is the Fourier transform of the auto-correlation function of the noise, in case of stationary noise. The noise power spectrum is for instance described in "Scaling law for noise variance and spatial resolution in differential phase contrast computed tomography", G-H Chen et al, Med. Phys. 38 (2), February 2011.

In any of the above mentioned combination of input images, for slowly varying noise, and in the typical situation that distances between the voxel under consideration and its neighbors are equal, we can write (with $\sigma_{\Delta V, U}^2$ indicating the estimated variances):

$$VAR(V_x-V_0)=VAR(V_y-V_0)=\sigma_{\Delta V}^2 \quad (7a)$$

$$VAR(U_x-U_0)=VAR(U_y-U_0)=\sigma_{\Delta V}^2 \quad (7b)$$

It is envisaged herein to compute the error propagation (to so obtain the estimated variances and hence the normalization factors $1/\sigma_{\Delta V}$, $1/\sigma_{\Delta U}$) once based on the input images, and to then use the same normalization factor through the remainder of the iterations if an iterative solution algorithm is used. However in other embodiments, an occasional re-estimation of the variances (and hence of the normalization factors) may be done.

As briefly mentioned above, in the embodiment where T is or includes a de-noising algorithm, this can be seen as a special case of the above formalism (as per Eq. (2) for iterative transformation where in each data term, the identity matrix is taken instead of the forward projector matrix A and u, v now relate to the noise corrupted images u, v and U, V are denoised estimates generated by an iterative de-noising algorithm. The objective function can again be optimized (maximized or minimized) by suitable numerical solvers and R corresponds to (6) above, for any suitable norm, for instance the nuclear norm or for a suitable functional as disclosed in in the Erhardt reference.

It will also be understood that the above can be generalized to any N-modality or N-contrast or N-channel (N>2, such as 3 or 4 channels or any other number larger than 2) application. In this case, the above equations are generalized as per $F(U_i, \ldots U_N)$ and $L(U_i, \ldots, U_N)$ for each channel $1, \ldots, N$.

As an extension of any of the above, there are embodiments envisaged herein where the estimated variances are non-isotropic, that is the estimated variances may be different for the different spatial directions x,y (an effect that happens for instance in CT if the imaged object is highly asymmetric). In this embodiment the regularizer R may look like:

$$R(U,V) = \|G'(U,V)\| = \left\| \begin{pmatrix} (V_x - V_0)/\sigma_{\Delta V_x} & (V_y - V_0)/\sigma_{\Delta V_y} \\ U_x - U_0/\sigma_{\Delta U_x} & U_y - U_0/\sigma_{\Delta U_y} \end{pmatrix} \right\| \quad (6a)$$

where $\sigma_{\Delta V_x}$ denotes the square root of the estimated variance of $(V_x-V_0)$ and $\sigma_{\Delta V_y}$, $\sigma_{\Delta U_x}$, and $\sigma_{\Delta U_y}$ are defined respectively. It is also envisioned to calculate the non-isotropic variances, but to then average them for reconstruction so that eq (6a) may then be rewritten in the form as per eq. (6).

Although the penalizer R has been written in eqs (6), (6a) solely in terms of the normalized gradients (matrix G'), this may not necessarily be so for all embodiments. In other word, more complex embodiments are also envisaged where the regularizer includes more terms than the normalized gradient term as per eq (6)(6a). The other one or more terms are configured to penalize roughness separately for each image, etc. or are configured to enforce other a prior desired image structures or other properties.

It should be appreciated that the terms "optimization" or "optimizer" as used above designate a numerical optimization scheme. This does not necessarily imply that the output images are optimal in an absolute sense. For one reason, the solution algorithm used may not necessarily converge during iteration towards a global minimum but may converge to a local minimum. Second, even if the iterations were to converge to the global minimum, the iterations herein may be aborted after a few iterations, to save resources or for whatever reason. For instance, one abort condition may be that iterations are to halt if there is no significant change at the output after a pre-defined number of iteration steps. In yet other words, the transformed (reconstructed, de-noised etc.) images U, V produced at the output of the proposed image processing system or by way of the described method are not necessarily the best possible solutions but may be acceptable approximations thereof in the relevant context or circumstance.

In another exemplary embodiment of the present invention, a computer program or a computer program element is provided that is characterized by being adapted to execute the method steps of the method according to one of the preceding embodiments, on an appropriate system.

The computer program element might therefore be stored on a computer unit, which might also be part of an embodiment of the present invention. This computing unit may be adapted to perform or induce a performing of the steps of the method described above. Moreover, it may be adapted to operate the components of the above-described apparatus. The computing unit can be adapted to operate automatically and/or to execute the orders of a user. A computer program may be loaded into a working memory of a data processor. The data processor may thus be equipped to carry out the method of the invention.

This exemplary embodiment of the invention covers both, a computer program that right from the beginning uses the invention and a computer program that by means of an up-date turns an existing program into a program that uses the invention.

Further on, the computer program element might be able to provide all necessary steps to fulfill the procedure of an exemplary embodiment of the method as described above.

According to a further exemplary embodiment of the present invention, a computer readable medium, such as a CD-ROM, is presented wherein the computer readable medium has a computer program element stored on it which computer program element is described by the preceding section.

A computer program may be stored and/or distributed on a suitable medium, such as an optical storage medium or a solid-state medium supplied together with or as part of other hardware, but may also be distributed in other forms, such as via the internet or other wired or wireless telecommunication systems.

However, the computer program may also be presented over a network like the World Wide Web and can be downloaded into the working memory of a data processor from such a network. According to a further exemplary embodiment of the present invention, a medium for making a computer program element available for downloading is provided, which computer program element is arranged to perform a method according to one of the previously described embodiments of the invention.

It has to be noted that embodiments of the invention are described with reference to different subject matters. In particular, some embodiments are described with reference to method type claims whereas other embodiments are described with reference to the device type claims. However, a person skilled in the art will gather from the above and the following description that, unless otherwise notified, in addition to any combination of features belonging to one type of subject matter also any combination between features relating to different subject matters is considered to be disclosed with this application. However, all features can be combined providing synergetic effects that are more than the simple summation of the features.

While the invention has been illustrated and described in detail in the drawings and foregoing description, such illustration and description are to be considered illustrative or exemplary and not restrictive. The invention is not limited to the disclosed embodiments. Other variations to the disclosed embodiments can be understood and effected by those skilled in the art in practicing a claimed invention, from a study of the drawings, the disclosure, and the dependent claims.

In the claims, the word "comprising" does not exclude other elements or steps, and the indefinite article "a" or "an" does not exclude a plurality. A single processor or other unit may fulfill the functions of several items re-cited in the claims. The mere fact that certain measures are re-cited in mutually different dependent claims does not indicate that a combination of these measures cannot be used to advantage. Any reference signs in the claims should not be construed as limiting the scope.

The invention claimed is:

1. An image processing system, comprising:
an input port implemented by a computer processor for receiving a plurality of input images including two or more input images of the same object,
wherein the object has two or more different contrast modes,
wherein each input image is representative of one or a combination of the different contrast modes of the object; and
an image transformer implemented by the computer processor configured to transform the plurality of the two or more input images into respective transformed images or respective intermediate images;
wherein operation of the transformer is driven by a regularized objective function that includes a regularizer function as at least one functional component;
wherein the regularizer function includes at least one term computed from noise normalized gradients in at least one of the two or more transformed images or in at least one of the respective intermediate images generated during operation of said image transformer.

2. The image processing system as per claim 1, wherein the image transformer is configured to implement a reconstruction algorithm, the two or more transformed images being respective reconstructions for the respective contrast modes from input images, the two or more transformed images or the intermediate images being generated during the course of one or more iterations, wherein at least one of the input images are projection images detected at a detector of an imaging system after interaction of radiation with said object.

3. The image processing system of claim 1, wherein the normalization of the gradients is based on at least one local statistical variance in at least one of the respective input images or intermediate images or transformed images.

4. The image processing system of claim 3, wherein the variances are obtained from error propagation through an analytical reconstruction based on at least one of the input images.

5. The image processing system of claim 3, wherein the variances are estimated based on respective voxel data in at least one of the respective input images or at least one of the intermediate images or at least one of the transformed images.

6. The image processing system of claim 1, wherein the two or more input images for the different contrast modes include any one of: i) the refraction image or absorption image or dark field image as obtained in phase contrast imaging, ii) the respective images obtained in spectral imaging in respective ones of at least two energy channels.

7. The image processing system of claim 1, wherein the image transformer is configured to implement an image denoising algorithm, the respective transformed images being the respective images output by the algorithm as denoised versions of the two or more input images.

8. The image processing system of claim 7, wherein at least one of the two or more input images are generated as respective filtered backward-projection images from projection images data.

9. The image processing system of claim 7, wherein the input images are respective color channels of an optical imaging system.

10. An image processing method comprising the steps of:
receiving a plurality of images including two or more images of the same object, wherein the object has two or more different contrast modes, wherein each image is representative of one or a combination of the different contrast modes of the object; and
transforming the plurality of the two or more images into respective transformed images or respective intermediate images;
wherein operation of the transformer is driven by a regularized objective function that includes a regularizer function as at least one functional component;
wherein the regularizer function includes at least one term computed from noise normalized gradients in at least one of the two or more transformed images or in at least one of the respective intermediate images generated during operation of said image transformer.

11. A computer program element for controlling a system, which, when being executed by a processing unit, is adapted to perform the method steps of claim 9.

12. A computer readable medium with computer readable instructions, which, when executed by a processor, is configured to cause the processor to:
receive a plurality of images including two or more images of the same object, wherein the object has two or more different contrast modes, wherein each image is representative of one or a combination of the different contrast modes of the object; and
transform the plurality of the two or more images into respective transformed images or respective intermediate images;
wherein transforming is driven by a regularized objective function that includes a regularizer function as at least one functional component;
wherein the regularizer function includes at least one term computed from noise normalized gradients in at least one of the two or more transformed images or in at least one of the respective intermediate images generated during transformation.

13. The computer readable medium of claim 12, wherein the image transforming includes implementing a reconstruction algorithm, the two or more transformed images being respective reconstructions for the respective contrast modes from input images, the two or more transformed images or the intermediate images being generated during the course of one or more iterations, wherein at least one of the input images are projection images detected at a detector of an imaging system after interaction of radiation with said object.

14. The computer readable medium of claim 12, wherein the normalization of the gradients is based on at least one local statistical variance in at least one of the respective input images or intermediate images or transformed images.

15. The computer readable medium of claim 14, wherein the variances are obtained from error propagation through an analytical reconstruction based on at least one of the input images.

16. The computer readable medium of claim 14, wherein the variances are estimated based on respective voxel data in at least one of the respective input images or at least one of the intermediate images or at least one of the transformed images.

17. The computer readable medium of claim 12, wherein the two or more input images for the different contrast modes include any one of: i) the refraction image or absorption image or dark field image as obtained in phase contrast imaging, ii) the respective images obtained in spectral imaging in respective ones of at least two energy channels.

18. The computer readable medium of claim 12, the transformation implements an image denoising algorithm, the respective transformed images being the respective images output by the algorithm as denoised versions of the two or more input images.

19. The computer readable medium of claim 12, wherein the regularized objective function is F(U, V)=L(U, V)+βR(U, V), wherein F(U, V) is the objective function for the transformed images, L is a log-likelihood function for the plurality of images, is a regularization parameter, and R(U, V) is the regularizer for the transformed images.

20. The computer readable medium of claim 12, wherein the regularizer is a function defined as $$R(U, V) = \|G'(U, V)\| = \left\|\begin{pmatrix} (V_x - V_0)/\sigma_{\Delta V} & (V_y - V_0)/\sigma_{\Delta V} \\ U_x - U_0/\sigma_{\Delta U} & U_y - U_0/\sigma_{\Delta U} \end{pmatrix}\right\|,$$

wherein R(U,V) is the regularizer for the transformed images, G'(U,V) is the normalized gradient, σΔV x is a square root of the estimated variance of (Vx−V0) and αΔV y, σΔU x, and αΔU y are defined respectively.

* * * * *